United States Patent
Dietrich et al.

(10) Patent No.: US 7,550,881 B1
(45) Date of Patent: Jun. 23, 2009

(54) VIBRATION DAMPER FOR GENERATOR OR MOTOR STATOR

(75) Inventors: Robert A. Dietrich, Montebello, CA (US); Steven R. Eccles, Torrance, CA (US); Sam Shiao, Cerritos, CA (US)

(73) Assignee: Honeywell International Inc., Morristown, NJ (US)

( * ) Notice: Subject to any disclaimer, the term of this patent is extended or adjusted under 35 U.S.C. 154(b) by 507 days.

(21) Appl. No.: 11/334,254

(22) Filed: Jan. 17, 2006

(51) Int. Cl.
 *H02K 5/24* (2006.01)
(52) U.S. Cl. ............................. 310/51; 310/89; 310/91; 310/154.12; 310/156.12; 310/270
(58) Field of Classification Search .................. 310/51, 310/270, 154.12, 156.12, 91, 89, 42, 87, 310/88; *H02K 5/24*
See application file for complete search history.

(56) References Cited

U.S. PATENT DOCUMENTS

| | | | |
|---|---|---|---|
| 1,688,891 A | | 10/1928 | Spreen |
| 3,229,134 A | | 1/1966 | Rakula |
| 3,406,979 A | * | 10/1968 | Weber ........................ 277/629 |
| 4,250,423 A | | 2/1981 | Linscott, Jr. |
| 4,877,986 A | * | 10/1989 | Shimizu ..................... 310/153 |
| 5,042,150 A | * | 8/1991 | Fraser, Jr. .............. 29/888.022 |
| 5,596,238 A | * | 1/1997 | Milnikel ..................... 310/103 |
| 5,619,389 A | * | 4/1997 | Dunfield et al. .......... 360/98.07 |
| 5,861,691 A | | 1/1999 | Soh et al. |
| 6,076,795 A | * | 6/2000 | Scheidel et al. ............. 248/603 |
| 6,160,331 A | * | 12/2000 | Morreale ..................... 310/51 |
| 6,517,328 B2 | | 2/2003 | Makino et al. |
| 6,614,140 B2 | * | 9/2003 | Uemura et al. ......... 310/156.12 |
| 6,641,376 B1 | | 11/2003 | Englander |
| 6,817,431 B1 | * | 11/2004 | Rasch ........................ 180/65.2 |
| 7,414,341 B2 | * | 8/2008 | Yokota ................... 310/156.28 |
| 2002/0047338 A1 | * | 4/2002 | Uemura et al. ................. 310/51 |
| 2003/0201681 A1 | * | 10/2003 | Shimizu et al. ............... 310/51 |
| 2004/0012289 A1 | * | 1/2004 | Gross et al. ................... 310/91 |
| 2004/0124720 A1 | * | 7/2004 | Condamin et al. ............ 310/51 |
| 2005/0042944 A1 | | 2/2005 | Brach et al. |

FOREIGN PATENT DOCUMENTS

| | | | | |
|---|---|---|---|---|
| JP | 55088544 | A | * | 7/1980 |
| JP | 57016542 | A | * | 1/1982 |
| JP | 05049208 | A | * | 2/1993 |
| WO | WO 03/005532 | A | | 1/2003 |

OTHER PUBLICATIONS

European Search dated May 7, 2007.

* cited by examiner

*Primary Examiner*—Quyen P Leung
*Assistant Examiner*—John K Kim
(74) *Attorney, Agent, or Firm*—Oral Caglar, Esq.

(57) ABSTRACT

A vibration damping sleeve for a stator assembly having radial vibration isolator features at both ends is provided. At one end, the vibration damping sleeve comprises a groove for a damping element such as an annular gasket while a plurality of beams circumferentially disposed are at the other end. The plurality of beams may comprise mounting flanges for mounting the stator to a housing support.

20 Claims, 5 Drawing Sheets

VIBRATION DAMPER FOR GENERATOR OR MOTOR STATOR

BACKGROUND OF THE INVENTION

The present invention relates generally to a motor or generator stator and more specifically to vibration dampers for generator or motor stators.

In certain motor or generator design situations it is necessary for the stator to be installed by shrink fit into an intermediate sleeve, which in turn is locked into the housing by either pin joint or bolt joints. The housing materials are typically made of either aluminum or magnesium which would have a higher thermal coefficient of expansion than the intermediate sleeve which would be made of a steel alloy. Therefore, during operation when heat is generated by the generator or motor, a gap may develop between the sleeve and housing at the higher operating temperatures. The gap will introduce detrimental stresses at the contact surface between the end of the sleeve and housing under vibration and thus reduce the life of the generator or motor.

U.S. Pat. No. 4,250,423 addresses these detrimental stresses by utilizing a generally cylindrical support structure for the stator of a generator where the support structure is either in the form of a housing or a support ring within the housing. The stator and support structure are formed of materials having substantially different thermal expansion rates and the stator fits within the support structure with an interference fit throughout the operating temperature range of the generator. While the support structure of the '423 patents helps to alleviate problems due to thermal stress, it does not address problems due to vibrational stress.

U.S. Patent Application No. 2004/0124720 discloses a stator assembly having first and second damping elements placed between a two part cover of the stator. The first damping elements are o-rings that are placed on both ends of the stator assembly to dampen vibration of the stator. A second damping element may also be used for additional damping. The damping elements are disposed such that a duct is formed between the two parts of the cover for passing a cooling fluid through. While this stator assembly reduces vibrational stress on the stator, it is complex, requiring two sets of damping elements on each end of the stator.

As can be seen, there is a need for a stator assembly for reducing damaging vibrations during operation of a generator or motor. It would also be desirable if such an assembly were easy and cost effective to produce.

SUMMARY OF THE INVENTION

In one aspect of the present invention there is provided a vibration damping sleeve for a stator, the vibration damping sleeve comprising an open body with a first end and a second end and wherein the stator is disposed axially within the open body; a groove disposed circumferentially at the first end of the body; and a plurality of beams extending axially and disposed circumferentially at the second end of the body.

In yet another aspect of the present invention there is provided a vibration damping sleeve for a stator wherein the vibration damping sleeve is disposed between the stator and a housing, the vibration damping sleeve comprising an open body with a first end and a second end and wherein the stator is disposed axially within the open body; a groove disposed circumferentially at the first end of the body; a damping element disposed in the groove; and a plurality of beams extending axially and disposed circumferentially at the second end of the open body, wherein at least one of the plurality of beams comprises a mounting flange.

In a further aspect of the present invention there is provided a stator assembly comprising a stator; a vibration damping sleeve comprising an open body with a first end and a second end, the stator being disposed axially within the open body and wherein the vibration damping sleeve further comprises a groove disposed circumferentially at the first end of the body, a damping element disposed in the groove and a plurality of beams extending axially and disposed circumferentially at the second end of the open body, wherein at least one of the plurality of beams comprises a mounting flange; and a housing, wherein the vibration damping sleeve is disposed between the stator and the housing and wherein the stator is secured to the housing through the mounting flange on at least one of the plurality of beams of the vibration damping sleeve.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides a vibration damping sleeve for a stator. The vibration damping sleeve may be disposed between the stator and a housing. The vibration damping sleeve may comprise a pre-loaded annular gasket at one end and a series of loading beams at the other end that may act as vibration isolators and/or dampeners. The vibration damping sleeve of the present invention may be used in any stator assemblies in generators or motors.

By introducing these, the pre-loaded annular gasket at one end and the series of loading beams at the other end of the vibration damping sleeve, detrimental contact and loading can be avoided between the vibration damping sleeve and the housing. Moreover, with the damping vibration sleeve and the stator assembly supported by vibration isolators and/or dampeners at both ends, vibration induced stresses may be reduce in both the vibration damping sleeve and the housing. In contrast, the sleeves of the prior art only have a single damping feature.

Figure 1:
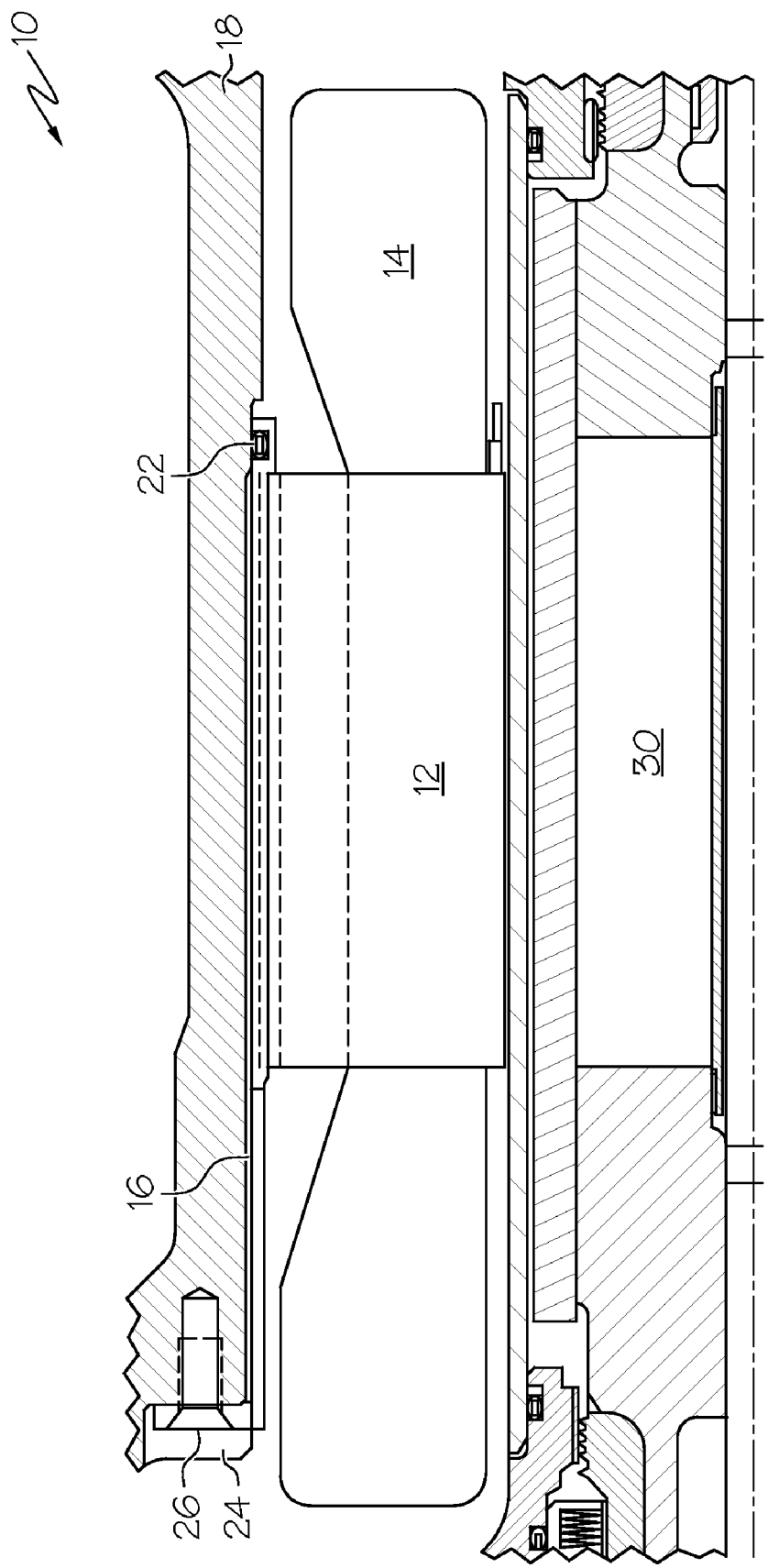
FIG. 1 is a cross-sectional view of a stator and winding mounted in a motor according to the invention.

Illustrated in FIG. 1 is a motor 10 which may comprise a stator 12. Stator 12 may be made up of laminated layers and may comprise a plurality of slots in which a plurality of windings 14 are inserted. A rotor 30 may be disposed within stator 12 such that rotor 30 may freely turn. Motor 10 may also comprise a vibration damping sleeve 16 which may be shrink fit to stator 12. It may be desirable to have vibration damping sleeve 16 fit stator 12 such that there is little or no slipping between the two parts. Vibration damping sleeve 16 may connect stator 12 to a housing 18, or any other desired host structure. Vibration damping sleeve 16 may comprise a mounting flange 24 which may attach vibration damping sleeve 16 to housing 18 with a bolt 26. Vibration damping sleeve 16 may further comprise a damping element 22 at the opposite end from the mounting flanges.

Figure 2:
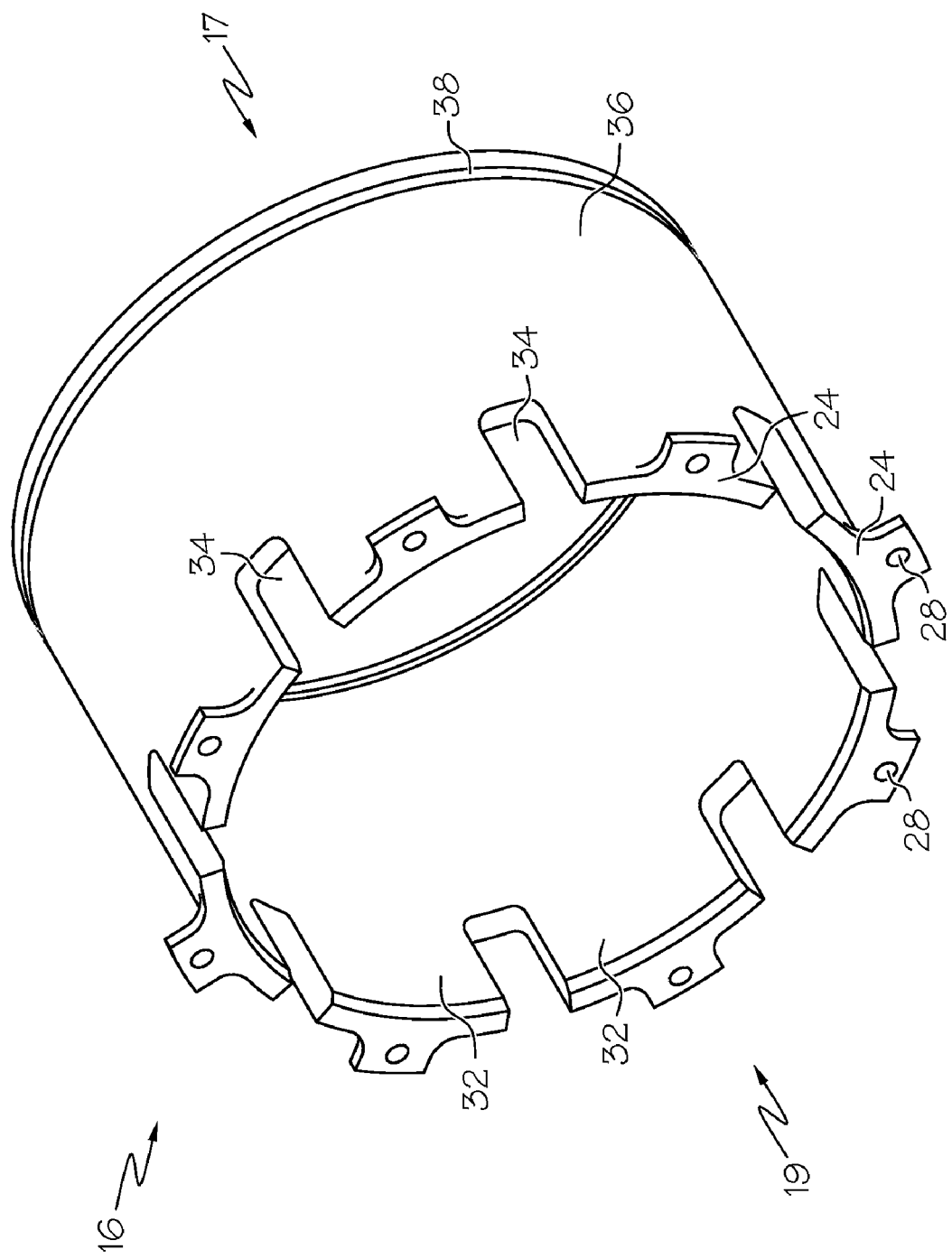
FIG. 2 is a perspective view of a vibration damping sleeve according to the present invention.

Vibration damping sleeve 16 is shown in greater detail in FIG. 2. Vibration damping sleeve 16 may comprise an open body 36 having a first end 17 and a second end 19. The shape of open body 36 may be cylindrical as shown in FIG. 2 or it may be any other shape required to fit stator 12 properly. At first end 17, vibration damping sleeve 16 may comprise a groove 38 disposed circumferentially around open body 36. The dimensions of groove 38 may be to fit a damping element (such as damping element 22 in FIG. 1) in the groove. The damping element may act as both a self-centering device for vibration damping sleeve 16 with respect to housing 18 and also provide damping to the vibration damping sleeve 16 and housing 18 under vibration loading.

Figure 3:
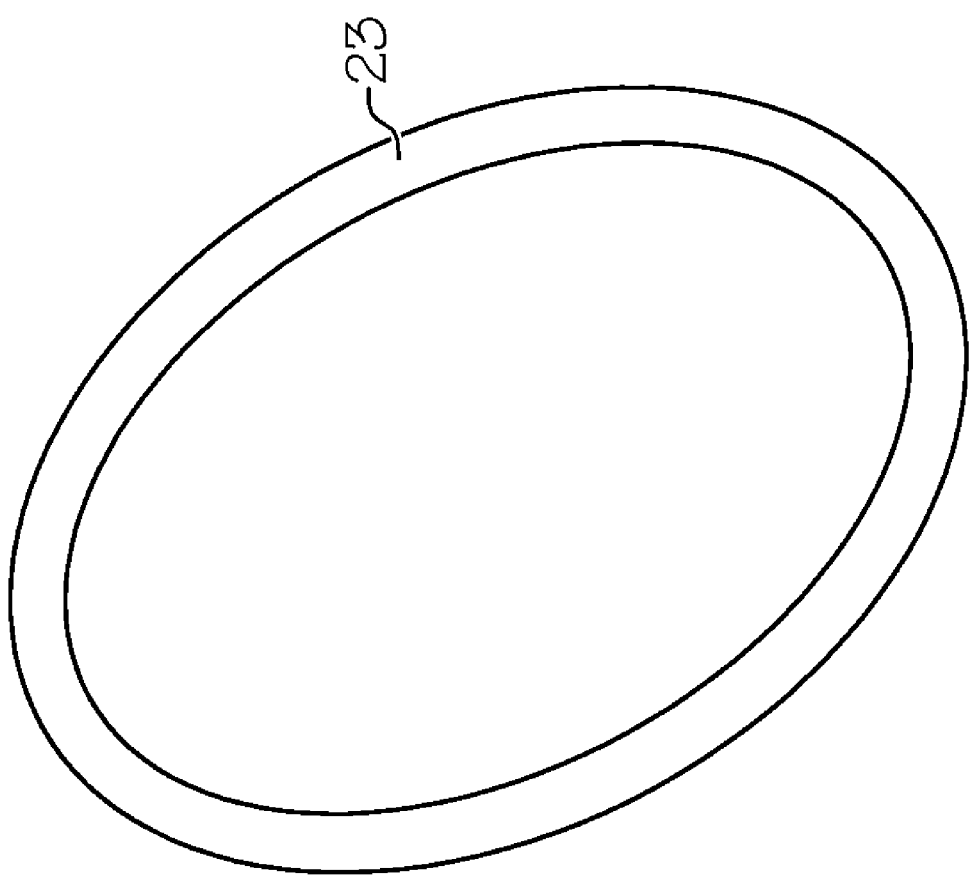
FIG. 3 is a perspective view of an o-ring for use with a vibration damping sleeve according to the present invention.
Figure 4:
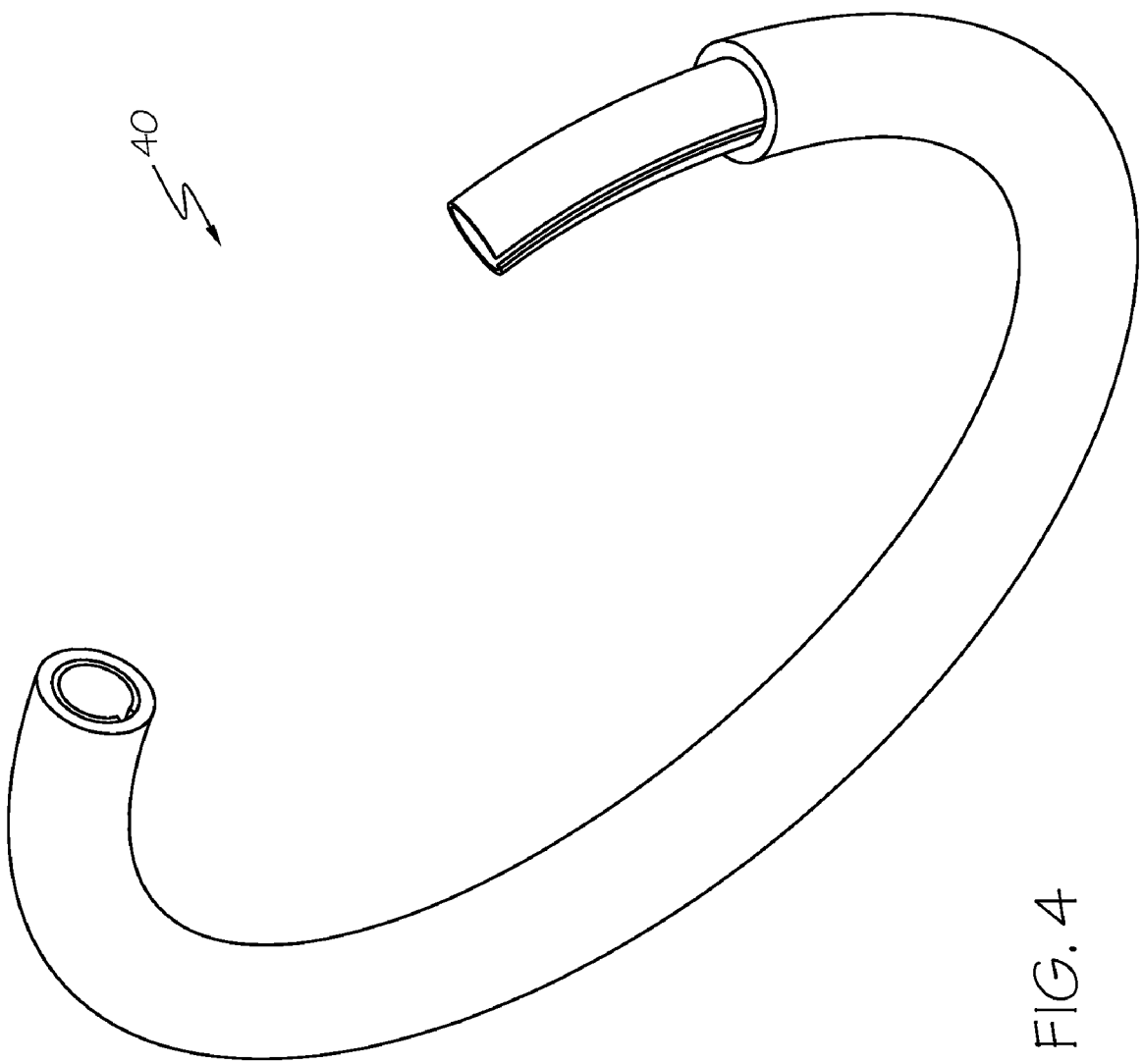
FIG. 4 is a perspective view of an o-ring used as a damping element with internal reinforcements.
Figure 5:
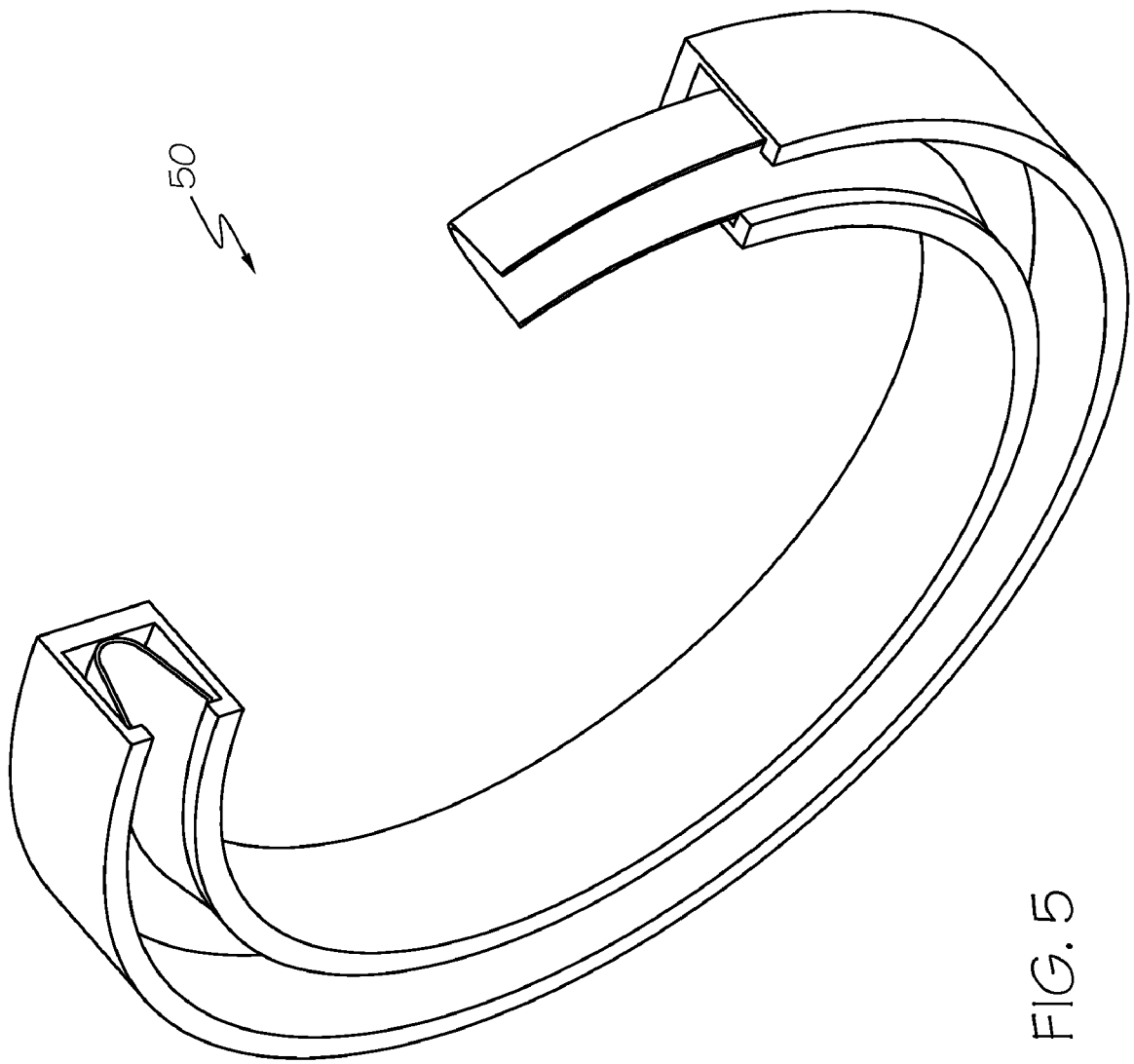
FIG. 5 is a perspective view of a damping element that is U-shaped piece of metal comprising an elastomer coating.

The damping element may be an annular gasket which may comprise elastomeric materials and where the annular gasket may be optionally closed. The damping element may be provided with internal reinforcement such as, but not limited to, springs or metal pieces 40 as seen in FIG. 4. The shape of the damping element may be circular, square, rectangular, with lips, chevron-shaped, etc. By way of non-limiting example, the damping element may be an O-ring 23 (see FIG. 3) or it may be a U-shaped piece of metal comprising an elastomer coating 50 as seen in FIG. 5. Elastomeric materials and coatings may be, but not limited to, rubber, nylon or any material having elastic properties or any material or part having damping properties. Proper selection on the size, shape and material of the damping element may be determined by the skilled artisan according to the particular loading requirements of the generator or motor installation. Design programs such as, but not limited to, ANSYS® may be used for such a determination.

At second end 19, vibration damping sleeve 16 may comprise a plurality of beams 32 extending axially from open body 36 and disposed circumferentially around second end 19 of open body 36 (FIG. 2). Beams 32 may be separated by open slots 34. Beams 32 may be of similar size and spacing, or they may individually vary from one another. Beams 32 may extend beyond stator 12 (see FIG. 1 for a non-limiting example). The dimensions as well as the number of beams may be determined by the skilled artisan according to the particular load requirements of the generator or motor installation, as described above. At least one of the plurality of beams 32 may comprise a mounting flange 24 and a bolt hole 28 for securing vibration damping sleeve 16 and stator 12 to housing 18 (see FIG. 1). Alternatively, mounting flange 24 may not include bolt hole 28 where the mounting flanges are welded to housing 18. While not wishing to be bound by theory, beams 32 may function to both solidly hold the stator in the proper axial position and also act as radial vibration isolators in the radial direction.

Vibration damping sleeve 16 may be fabricated by normal machine practices known in the art. Beams 32 may then be created by simple milling of the second end 19 of vibration damping sleeve 16. By way of non-limiting example, vibration damping sleeve 16 may comprise a steel alloy.

It should be understood, of course, that the foregoing relates to exemplary embodiments of the invention and that modifications may be made without departing from the spirit and scope of the invention as set forth in the following claims.

We claim:

1. A vibration damping sleeve for a stator, the vibration damping sleeve comprising:
   an open body with a first end and a second end and wherein the stator is disposed axially within the open body;
   a groove disposed circumferentially at the first end of the body;
   a plurality of beams extending axially and disposed circumferentially at the second end of the body; and
   a plurality of open slots juxtaposed between the plurality of beams;
   wherein said plurality of beams further comprises:
   a mounting flange extending radially at a terminal surface at each of the plurality of beams; and
   a plurality of bolt holes extending axially at each of the plurality of mounting flanges.

2. The vibration damping sleeve of claim 1 further comprising a damping element in the groove.

3. The vibration damping sleeve of claim 2 wherein the damping element comprises an annular gasket.

4. The vibration damping sleeve of claim 3 wherein the annular gasket is a closed gasket.

5. The vibration damping sleeve of claim 4 wherein the annular gasket is an O-ring.

6. The vibration damping sleeve of claim 5 wherein the O-ring comprises rubber or nylon.

7. The vibration damping sleeve of claim 5 wherein the O-ring further comprises a spring embodied within.

8. The vibration damping sleeve of claim 2 wherein the damping element is a piece of U-shaped metal having an elastomer coating.

9. The vibration damping sleeve of claim 1 wherein at least one of the plurality of beams comprises a mounting flange.

10. The vibration damping sleeve of claim 9 wherein the vibration damping sleeve is attached to a housing through the mounting flange and wherein the vibration damping sleeve is disposed between the stator and the housing.

11. A vibration damping sleeve for a stator wherein the vibration damping sleeve is disposed between the stator and a housing, the vibration damping sleeve comprising:
   an open body with a first end and a second end and wherein the stator is disposed axially within the open body;
   a groove disposed circumferentially at the first end of the body;
   a damping element disposed in the groove; and
   a plurality of beams extending axially and disposed circumferentially at the second end of the open body, wherein at least one of the plurality of beams comprises a mounting flange and extends beyond the stator.

12. The vibration damping sleeve of claim 11 wherein the damping element is a closed annular gasket.

13. The vibration damping sleeve of claim 11 wherein the damping element is an O-ring or a piece of U-shaped metal.

14. The vibration damping sleeve of claim 11 wherein the vibration damping sleeve is attached to the housing through the mounting flange.

15. The vibration damping sleeve of claim 11 wherein each of the plurality of beams comprises a mounting flange.

16. The vibration damping sleeve of claim 11 wherein the vibration damping sleeve is part of a generator or motor.

17. The vibration damping sleeve of claim 11 wherein the stator is shrink-fit into the vibration damping sleeve.

18. A stator assembly comprising:
   a stator;
   a vibration damping sleeve comprising an open body with a first end and a second end, the stator being disposed axially within the open body and wherein the vibration damping sleeve further comprises a groove disposed circumferentially at the first end of the body, a damping element disposed in the groove and a plurality of beams extending axially and disposed circumferentially at the second end of the open body, wherein at least one of the plurality of beams comprises a mounting flange; wherein the number of the plurality of beams is determined based on a load requirement of the stator assembly; and a housing, wherein the vibration damping sleeve is disposed between the stator and the housing and wherein the stator is secured to the housing through the mounting flange on at least one of the plurality of beams of the vibration damping sleeve.

19. The stator assembly of claim 18 wherein the damping element is an O-ring or a piece of U-shaped metal.

20. The stator assembly of claim 18 wherein the stator assembly is part of a generator.

\* \* \* \* \*